UNITED STATES PATENT OFFICE.

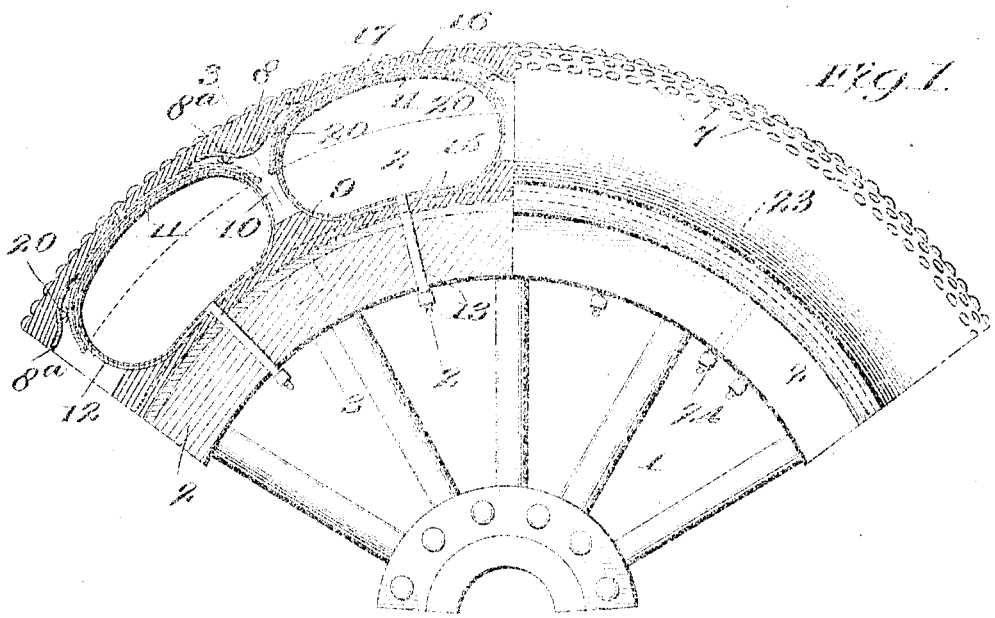
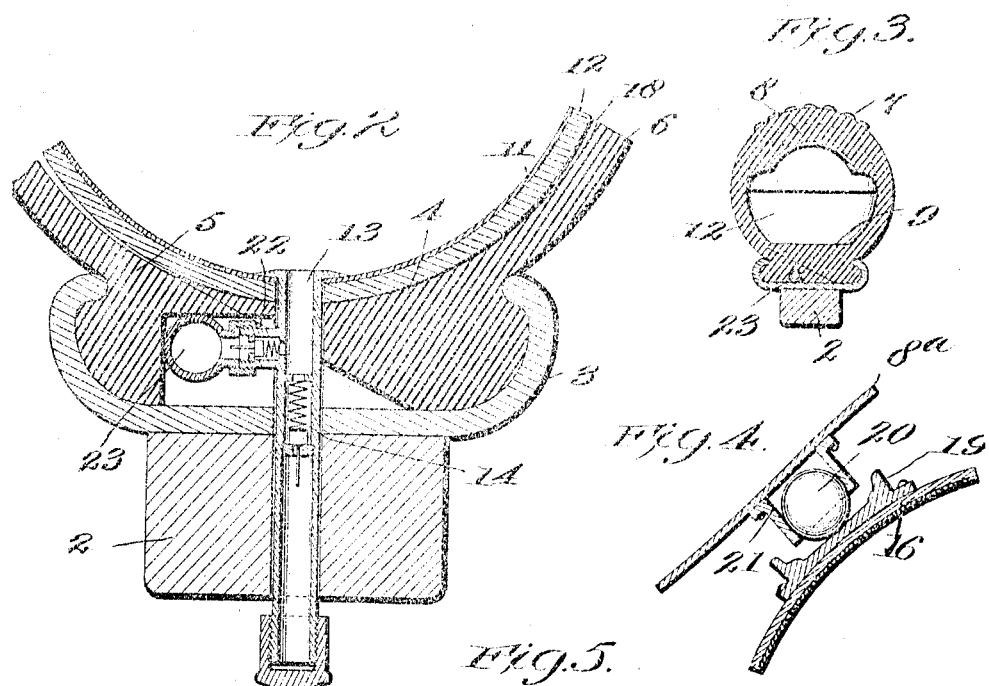

CHARLES F. WILLIAMS, OF ATLANTA, GEORGIA, ASSIGNOR OF SIXTY-TWO ONE-HUNDREDTHS TO JAMES T. ANDREW, OF MONTGOMERY, ALABAMA.

ARMORED PNEUMATIC TIRE.

1,001,492.      Specification of Letters Patent.      Patented Aug. 22, 1911.

Application filed November 24, 1909, Serial No. 529,806. Renewed January 19, 1911. Serial No. 603,594.

*To all whom it may concern:*

Be it known that I, CHARLES F. WILLIAMS, a citizen of the United States, residing at Atlanta, in the county of Fulton and State of Georgia, have invented certain new and useful Improvements in Armored Pneumatic Tires; and I do hereby declare the following to be a full, clear, and exact description of the invention, such as will enable others skilled in the art to which it appertains to make and use the same.

This invention relates to improvements in armored pneumatic tires, and especially to that class in which a plurality of separate chambers are provided.

One of the objects of the invention is to produce a multiple chamber pneumatic tire in which the chambers are formed by bulbs inflatable separately or conjointly, and in which the bulbs are held spaced apart and are protected against puncture by suitable armor arranged internally of the covering.

Other objects and advantages will appear from the following description, and while the invention is not restricted to the exact details shown and described, still for the purpose of disclosure reference is had to the accompanying drawings illustrating a practical embodiment of the invention, and the particular features of novelty will be more particularly pointed out in the claims.

In the drawings forming a part of this application like numerals designate the same parts in the several views, of which, Figure 1 is a fragmentary view of my improved tire as applied to a wheel rim, said view being partly in side elevation and partly in longitudinal section. Fig. 2 is a fragmentary sectional view on an enlarged scale, taken on the line 2—2 of Fig. 1. Fig. 3 is a cross section on the line 3—3 of Fig. 1. Fig. 4 is a local view illustrating the ball and socket arrangement between the bulb guard and casing, and Fig. 5 is a bottom plan view of an inflated bulb.

1 designates a wheel of ordinary construction, in the drawings illustrated as having the wooden felly 2 and the metallic rim 3 of cup shape construction to receive the enlarged heels 4 and 5 of the tire casing. This casing is of the usual construction, the body portion 6 consisting of layers of rubber, canvas, or other material, and the tread portion may be provided with the usual form of roughened tread or may be provided with the anti-slipping or non-skidding buttons 7. The inner construction of the casing, however, is such that there are formed enlarged inwardly projecting shoulders 8 and 9, which may be solid rubber or other suitable material, projecting from the inside faces of the tread and the heel portions, and disposed entirely around the tire in opposed positions, forming chambers having the open necks 10 therebetween, such chambers being adapted to receive the inflatable bulbs hereinafter referred to. The contour of the lateral faces of the shoulders 9 is preferably curved when the form of bulbs is of oval shape, as illustrated, and the contour of the shoulders 8 is of curved construction, as shown, to snugly receive a metallic member hereinafter referred to.

11 designates a thin rubber bladder incased within a covering 12, which may be of heavier rubber or of other suitable flexible material, and this bladder is connected with the usual inflation nipple 13, provided with a valve 14 located a substantial distance from the inner end of the nipple to permit of the connection of another valve hereinafter referred to. This covering 12, as shown in Fig. 5, is provided with a slit which may be laced up, as at 15, to enable the thin rubber bladder to be readily inserted or withdrawn, should it become necessary to repair or otherwise replace the same. A plurality of these inflatable bulbs are disposed around the interior of the tire in the chambers heretofore mentioned, and when inflated the adjacent ends of the bulbs are separated a substantial distance by the open necks 10, as clearly shown in Fig. 1, the lower ends of the bulbs resting in the curved faces of the shoulders 9, and the upper ends being spaced apart from the shoulders 8. The outwardly disposed portion of the bulb is protected by a shield of rigid metal 16, the shield being securely held to the casing of the tire by means of central rivets 17. This shield is made of non-flexible metal, and is in the shape of a concave cap or cup-shape disk extending approximately half the depth of the bulbs, leaving an open space 18 between the inside of the tire casing and the outside of the bulb casing at a position immediately below the shields. Exteriorly of the cup-shape shields, and at the end thereof are disposed the socket plates 19, forming a seat for the revoluble balls 20, loosely journaled in a casing 21, but held against displacement therethrough by the fact that the end of the casing 21 is of a diameter slightly smaller than the diameter of the balls. The ball is inserted into this casing from the rear end and the casing is then bolted or otherwise suitably affixed to the inner face of a second shield 8ª of convex contour snugly fitting the projection or shoulder 8. Each of the inflation nipples 13 are provided with a second valve 22, extending laterally thereof and disposed between the valve 14 and the inner end of the nipple, these latter valves 22 communicating with an inflation tube 23, extending entirely around the tire, and which may be inflated by a further inflation valve 24.

Thus it will be seen in operation that I provide a tire which has all of the resiliency of a single tube tire, but which is practically puncture proof. It will also be noted that owing to the ball and socket contact that portion of the tread lying between the inflated bulbs is capable of being flexed evenly, so I am enabled to leave the space 10 between the bulbs and also provide for an equalization of pressure upon the bulbs. It will also be observed that in the event of a puncture, which is practically impossible, only one portion of the tire would be affected, and the injured bulb could be readily replaced later on by deflating the several bulbs and removing the tire, whereupon a new bulb could be inserted from the inside of the deflated tire. It will also be noted that the bulbs may be inflated independently, or they can be inflated conjointly, by means of the tube 23 connected to the valves 22 communicating with all of the nipples between the valve 14 and the inner end of the nipples.

Having thus described the invention, what I claim is:—

1. A pneumatic tire comprising a casing, a plurality of inflatable bulbs located in said casing, means for inflating said bulbs, protecting shields disposed between said bulbs and the tread of said casing, said shields being spaced apart circumferentially of said casing, a second set of shields carried by the inside face of the tread portion of said casing and alternating with said protecting shields, and rolling contacts between each group of shields, substantially as described.

2. A pneumatic tire comprising a casing, a plurality of cup-shaped shields carried by the inner face of the periphery of said casing and having their concave faces disposed inwardly, said cup-shaped shields being spaced apart circumferentially of the tire, a second set of shields carried by the inside face of the tread portion and alternating with said cup-shaped shields, said second set of shields projecting inwardly between the spaces formed by said separated shields, rolling contacts between each group of shields, inflatable bulbs partly incased by said cup-shaped shields, and means for inflating said bulbs, substantially as described.

3. A pneumatic tire comprising a casing, a plurality of cup-shaped shields carried on the inside face of the tread portion of said casing and spaced apart peripherally, a second set of shields carried by the inside tread portion of the tire and disposed in alinement with the interstices between the cup-shaped shields, a ball and socket contact between said shields, and the inflatable bulbs partially incased by said cup-shaped shields, substantially as described.

4. A pneumatic tire comprising a casing having internal opposed shoulders formed on the inside of the tread portion and the rim portion of the tire, said shoulders forming communicating chambers separated by a restricted or neck opening, a metallic shield for each of said shoulders on the tread portion, a plurality of cup-shaped shields secured to the inside of the tread portion and alternating with said first mentioned shields, rolling contacts between each set of shields, inflatable bulbs disposed within the chambers formed by said shoulders and partially incased by said cup-shaped shields, and means for inflating said bulbs, substantially as described.

In testimony whereof, I affix my signature, in presence of two witnesses.

CHARLES F. WILLIAMS.

Witnesses:
BIAS C. BUTLER,
B. C. SCHADE.